Patented May 22, 1934

1,959,564

UNITED STATES PATENT OFFICE 1,959,564

METHOD OF REFINING ROSIN

Joseph N. Borglin, Kenvil, N. J., assignor to Hercules Powder Company, Wilmington, Del., a corporation of Delaware No Drawing. Application November 11, 1930, Serial No. 494,925

18 Claims. (Cl. 87—2)

My invention relates to method for the refining of rosin. My invention relates to the refining of both wood and gum rosin and more particularly relates to the treatment of rosin for the removal of color bodies therefrom.

As is well known, gum rosin is derived from live pine trees by bleeding, while wood rosin is derived by extraction from pine wood, as stump wood, down wood, and the like.

Both wood and gum rosin contain color bodies or coloring matter which is visible to the eye and the rosin is more or less dark in color, depending upon the grade of the rosin observed. Wood rosin and certain low grades of gum rosin in addition to containing visible color bodies or coloring matter contain certain color bodies which are not normally visible to the eye, but which have a tendency to darken and discolor the rosin or its product, as when such color bodies are exposed to the action of air and an alkali, as for example, when the rosin is saponified.

The presence of visible coloring matter in rosin determines its grade and hence its value. The darker the rosin the lower its grade and value. The presence of invisible or, as I refer to them, latent color bodies while not effecting the apparent grade of the rosin, is highly disadvantageous and renders the rosin undesirable for use in the production of, for example, soaps, sizes, limed varnishes, etc., where palest color of the product and retention of color are desired.

Now, in accordance with my invention I provide a method whereby visible color bodies and latent color bodies, where present, may be removed from rosin in a simple and highly efficient manner and whereby rosin may be improved in grade and latent color bodies may be largely removed from wood rosin rendering such adaptable to uses for which it does not lend itself normally.

The method in accordance with my invention, from the broad standpoint, involves the treatment of rosin with oxalic acid. The treatment effects removal from the rosin of color bodies, visible and latent, it having been discovered by me that oxalic acid has the capacity for removing such color bodies from rosin. More particularly, the method in accordance with my invention involves removing color bodies from rosin in solution with oxalic acid in solution in a suitable solvent, whereby intimate contact between the rosin and oxalic acid may be obtained. Still more particularly, the heating of a rosin solution and an oxalic acid solution in admixture is contemplated, in order to obtain maximum efficient contact, and cooling of the admixed solutions, whether heated or at room temperature, in order to promote separation of the two solutions.

In the practical adaptation of the method in accordance with my invention, the rosin may be treated in solution in any suitable solvent therefor, as for example, a light petroleum distillate, as gasoline, mineral spirits, dipentene, pinene. The oxalic acid may be in solution in any suitable solvent which will not react with the solvent for the rosin and which will be substantially immiscible with the solvent for the rosin or capable of being rendered substantially immiscible therewith, as for example, by cooling or refrigeration. As solvents for the oxalic acid, I may use an alcohol, as for example, ethyl, methyl or butyl alcohol, or I may use acetone, ethyl acetate, etc.

In proceeding with the carrying out of the method embodying my invention, a solution of rosin to be refined in a suitable solvent is prepared, a solution containing about 15% of rosin being preferable. A solution of oxalic acid in a suitable solvent is formed. The oxalic acid solution will desirably be saturated. The two solutions are then admixed and intimate contact between them obtained by violent agitation, as by shaking, or by the application of heat, desirably with agitation. When the rosin solution has been thoroughly contacted with the oxalic acid solution or, in other words, thoroughly washed thereby, the two solutions are separated. Separation may be promoted by cooling the admixed solutions. The oxalic acid solution, and color bodies removed from the rosin which will be contained in the oxalic acid solution, is drawn off from the rosin solution and the rosin solution is then desirably washed, for example, with an alcohol and then desirably also with water. Refined rosin is recovered from the treated rosin solution, for example, by evaporating off the rosin solvent.

As illustrated of the practical carrying out of the method in accordance with my invention, for example, 300 grams of a 15% solution of rosin, for example, wood rosin grading FF in color, in gasoline is washed with a saturated solution of oxalic acid in 92% alcohol, say for example, ethyl alcohol. The washing of the rosin solution is desirably effected by agitating say 50 grams of the oxalic acid-alcohol solution with the rosin solution, separating the two solutions and repeating the treatment with another 50 gram portion of oxalic acid-alcohol solution. The treatment with 50 gram portions of oxalic acid-alcohol solution may desirably be repeated say three times. For example, after a third washing of the rosin solution and separation therefrom of the oxalic acid-alcohol solution the rosin solution will be desirably washed with, for example, a quantity of 70% alcohol, say ethyl alcohol, and then with water. The rosin is then recovered from the treated solution by evaporating off the rosin solvent. A yield of about 71% of rosin grading H will be obtained.

It will be understood that various procedure which will be obvious to those skilled in the art may be followed in the practice of the method in accordance with my invention. Thus, for example, in the above illustration separation of the oxalic acid-alcohol solution from the rosin solution may, on completion of the washing, be promoted by cooling the mixture down to a temperature say of about 15° C., or, if desired, the washing of the gasoline-rosin solution with the oxalic acid-alcohol solution may be effected at a temperature of say about 15° C., the admixed solutions being then cooled down to say a temperature of about 5° C. in order to promote their separation.

It will be understood that in accordance with my invention I contemplate the removal of color bodies, including latent color bodies, from wood or gum rosin through the use of oxalic acid as the active element, more particularly, I contemplate the treatment of the rosin in solution with oxalic acid in solution in a suitable solvent, with the use of detailed procedure which will be obvious to those skilled in the art.

It will be understood that no particular form of apparatus is necessary for the carrying out of the method in accordance with my invention, various apparatus for the carrying out of the method being obvious and it being understood that I contemplate the use of any form of apparatus lending itself to the carrying out of the method.

It will be understood that where the rosin is treated in solution with a solution of oxalic acid the solvents may be readily recovered for reuse.

What I claim and desire to protect by Letters Patent is:

1. The method for removing color bodies from rosin which includes extracting rosin in solution in a solvent therefor with oxalic acid in solution in a non-aqueous solvent capable of immiscibility with the rosin solvent.

2. The method for removing color bodies from rosin which includes extracting rosin in solution in a solvent therefor which is capable of immiscibility with alcohols with oxalic acid in solution in an alcohol.

3. The method for removing color bodies from rosin which includes extracting rosin in solution in gasoline with oxalic acid in solution in a non-aqueous solvent capable of immiscibility with gasoline.

4. The method for removing color bodies from rosin which includes extracting rosin in solution in gasoline with oxalic acid in solution in ethyl alcohol.

5. The method for removing color bodies from rosin which includes extracting rosin in solution in a solvent therefor with oxalic acid in solution in a non-aqueous solvent which is capable of immiscibility with the rosin solvent intimately mixing the two solutions, separating the oxalic acid solution and the color bodies extracted thereby from the rosin solution and recovering rosin from the rosin solution.

6. The method for removing color bodies from rosin which includes extracting rosin in solution in a solvent therefor with oxalic acid in solution in a non-aqueous solvent which is capable of immiscibility with the rosin solvent, heating the two solutions in admixture, cooling the solutions, separating the oxalic acid solution and color bodies extracted thereby from the rosin solution and recovering rosin from the rosin solution.

7. The method for removing color bodies from rosin which includes extracting rosin in solution in a solvent therefor with oxalic acid in solution in a non-aqueous solvent which is capable of immiscibility with the rosin solvent, intimately mixing the two solutions, separating the oxalic acid solution and the color bodies extracted thereby from the rosin solution, washing the rosin solution and recovering rosin from the rosin solution.

8. The method for removing color bodies from rosin which includes extracting rosin in solution in a solvent therefor with oxalic acid in solution in a non-aqueous solvent which is capable of immiscibility with the rosin solvent, intimately mixing the two solutions, separating the oxalic acid solution and the color bodies extracted thereby from the rosin solution, washing the rosin solution with an alcohol and recovering rosin from the rosin solution.

9. The method for removing color bodies from rosin which includes extracting rosin in solution in a solvent therefor with a saturated solution of oxalic acid in a non-aqueous solvent therefor, which is capable of immiscibility with the rosin solution.

10. The method for removing color bodies from rosin which includes extracting rosin in solution in a solvent therefor which is capable of immiscibility with alcohols with a non-aqueous, alcoholic solution of oxalic acid.

11. The method for removing color bodies from rosin which includes extracting rosin in solution in a solvent therefor which is capable of immiscibility with alcohols with a saturated, non-aqueous, alcoholic solution of oxalic acid.

12. The method for removing color bodies from rosin which includes extracting rosin in solution in a solvent which is capable of immiscibility with ethyl alcohol with oxalic acid in solution in ethyl alcohol.

13. The method for removing color bodies from rosin which includes extracting rosin in solution in a petroleum hydrocarbon solvent with oxalic acid in solution in a non-aqueous solvent therefor which is capable of immiscibility with the rosin solvent.

14. The method for removing color bodies from rosin which includes extracting rosin in solution in a terpene hydrocarbon solvent therefor with oxalic acid in solution in a non-aqueous solvent therefor which is capable of immiscibility with the rosin solvent.

15. The method of removing color bodies from rosin which includes extracting rosin in solution in a solvent which is capable of immiscibility with methyl alcohol with oxalic acid in solution in methyl alcohol.

16. The method of removing color bodies from rosin which includes extracting rosin in solution in a solvent which is capable of immiscibility with acetone with oxalic acid in solution in acetone.

17. The method for removing color bodies from rosin which includes extracting a solution of rosin in a solvent which is capable of immiscibility with methanol with a solution of oxalic acid in methanol.

18. The method for removing color bodies from rosin which includes extracting a solution of rosin in a solvent which is capable of immiscibility with acetone with a solution of oxalic acid in acetone.

JOSEPH N. BORGLIN.